US00RE40625E

(19) United States
(12) Reissued Patent
Wurz et al.

(10) Patent Number: US RE40,625 E
(45) Date of Reissued Patent: Jan. 27, 2009

(54) GAMING MACHINE

(75) Inventors: Norman R. Wurz, Des Plaines, IL (US); James M. Rasmussen, Chicago, IL (US); William C. Cesaroni, Glenview, IL (US); Robert J. Glenn, III, Elk Grove Village, IL (US); Jack B. Hough, Arlington Heights, IL (US)

(73) Assignee: WMS Gaming Inc., Waukegan, IL (US)

(21) Appl. No.: 29/236,160

(22) Filed: Aug. 11, 2005

Related U.S. Patent Documents

Reissue of:
(64) Patent No.: D. 459,402
Issued: Jun. 25, 2002
Appl. No.: 29/147,267
Filed: Aug. 24, 2001

U.S. Applications:
(60) Division of application No. 29/193,474, filed on Jul. 28, 2003, which is a continuation-in-part of application No. 09/441,125, filed on Nov. 17, 1999, now Pat. No. 6,334,612.

(51) LOC (9) Cl. ..... 21-01
(52) U.S. Cl. ..... D21/325; D21/369
(58) Field of Classification Search ..... D21/324–327, D21/333, 369, 370, 371; 463/1, 2, 13, 18, 463/19, 20, 46, 47, 29–35, 50–52; 273/148 B, 273/143 R; 482/901, 902; 343/3, 4
See application file for complete search history.

(56) References Cited

U.S. PATENT DOCUMENTS

| | | | | | |
|---|---|---|---|---|---|
| D333,164 | S | * | 2/1993 | Kraft et al. | D21/325 |
| 5,411,257 | A | | 5/1995 | Fulton | 273/85 |
| 5,820,460 | A | * | 10/1998 | Fulton | 463/13 |
| D419,606 | S | | 1/2000 | Toriyama | D21/325 |

(Continued)

*Primary Examiner*—Prabhakar Deshmukh
(74) *Attorney, Agent, or Firm*—Nixon Peabody LLP

(57) CLAIM

The ornamental design for a "gaming machine", as shown and described.

DESCRIPTION

FIG. 1 is an isometric view of a gaming machine showing our new design.
FIG. 2 is a front elevational view thereof.
FIG. 3 is a rear elevational view thereof.
FIG. 4 is a left side elevational view thereof.
FIG. 5 is a right side elevational view thereof.
FIG. 6 is a top plan view thereof[; and,].
FIG. 7 is a bottom plan view thereof.
*FIG. 8 is an isometric view of a gaming machine according to an alternative embodiment of our new design.*
*FIG. 9 is a front elevational view of the gaming machine of FIG. 8.*
*FIG. 10 is a rear elevational view of the gaming machine of FIG. 8.*
*FIG. 11 is a left side elevational view of the gaming machine of FIG. 8.*
*FIG. 12 is a right side elevational view of the gaming machine of FIG. 8.*
*FIG. 13 is a top plan view of the gaming machine of FIG. 8; and,*
*FIG. 14 is a bottom plan view of the gaming machine of FIG. 8.*
The broken lines shown *immediately adjacent the shaded areas represent the bounds of the claimed design while all other broken lines* are for illustrative purposes only [and]*; the broken lines* form no part of the claimed design.

1 Claim, 8 Drawing Sheets

Figure 1:
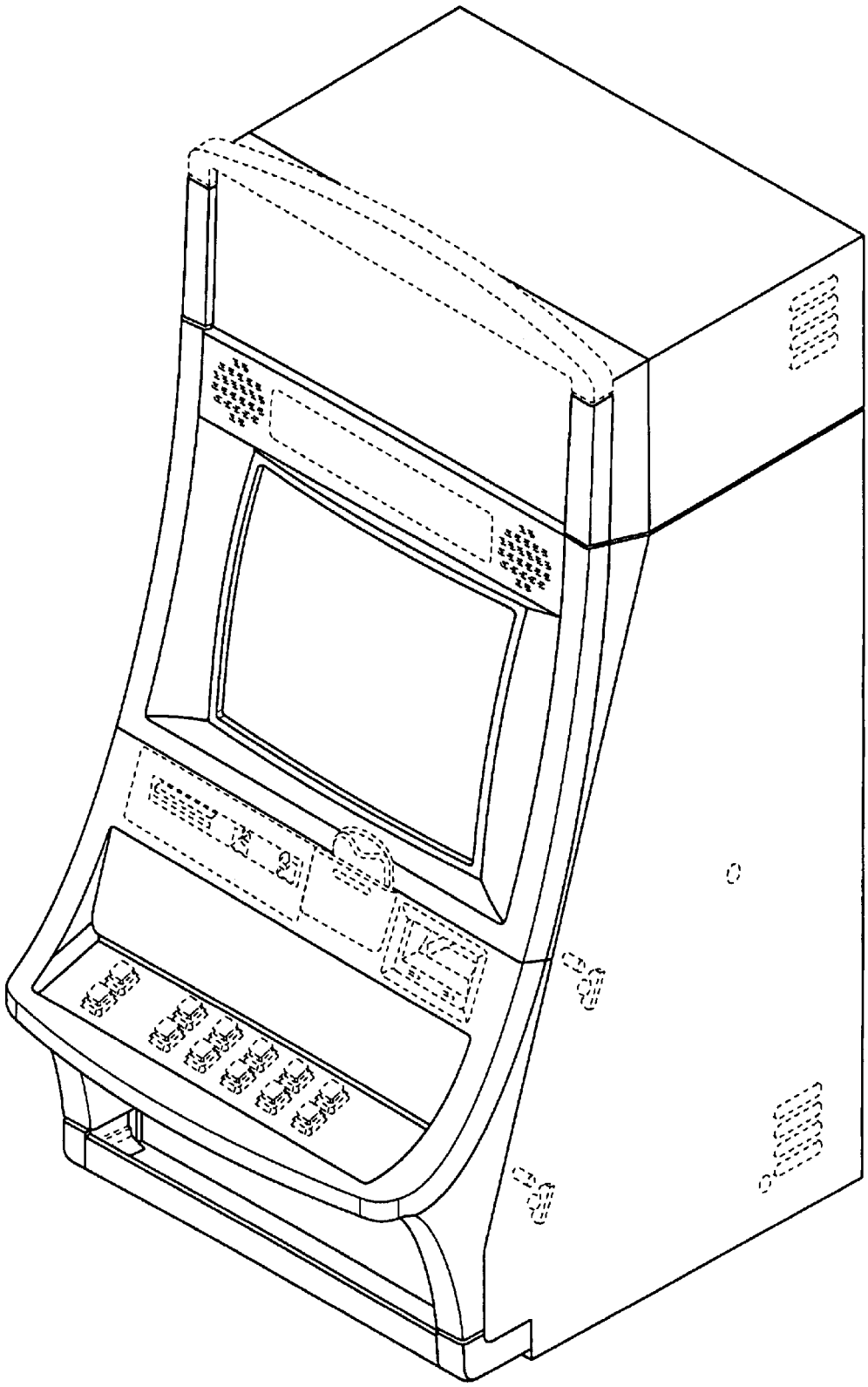
Figure 2:
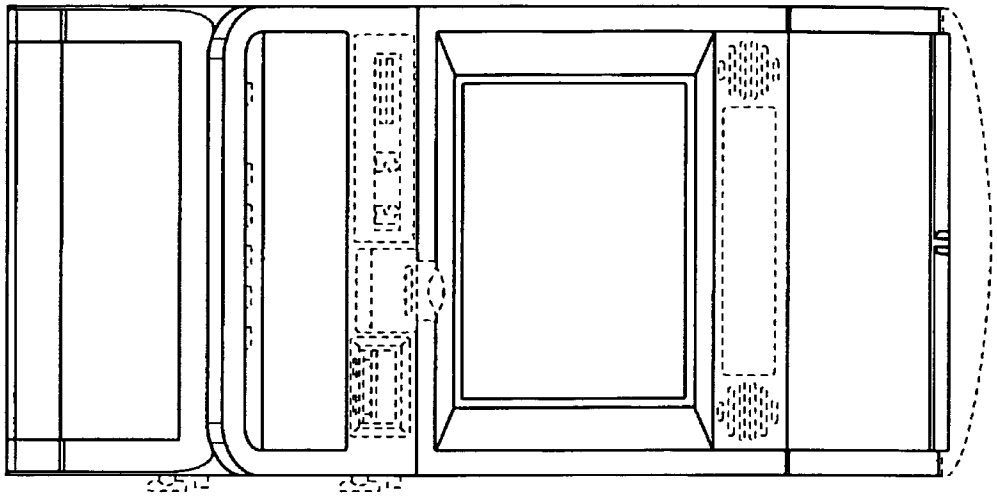
Figure 3:
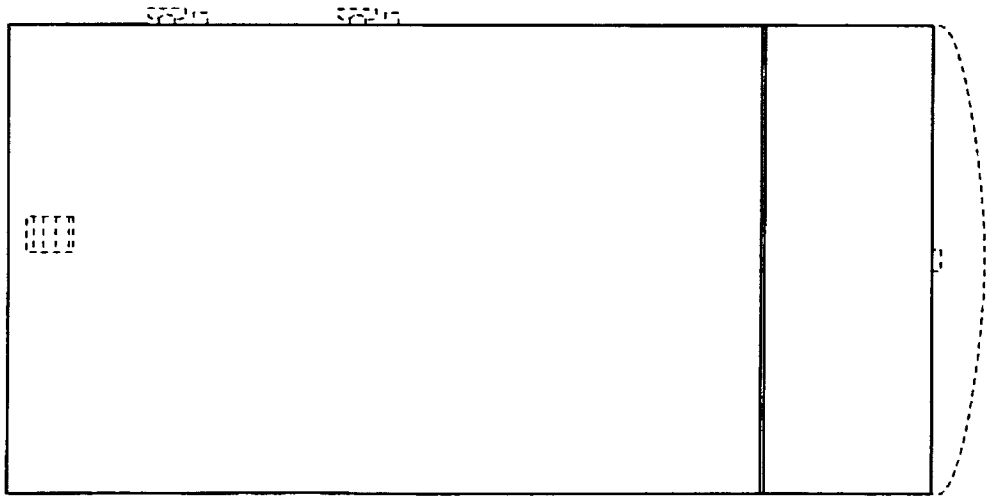
Figure 4:
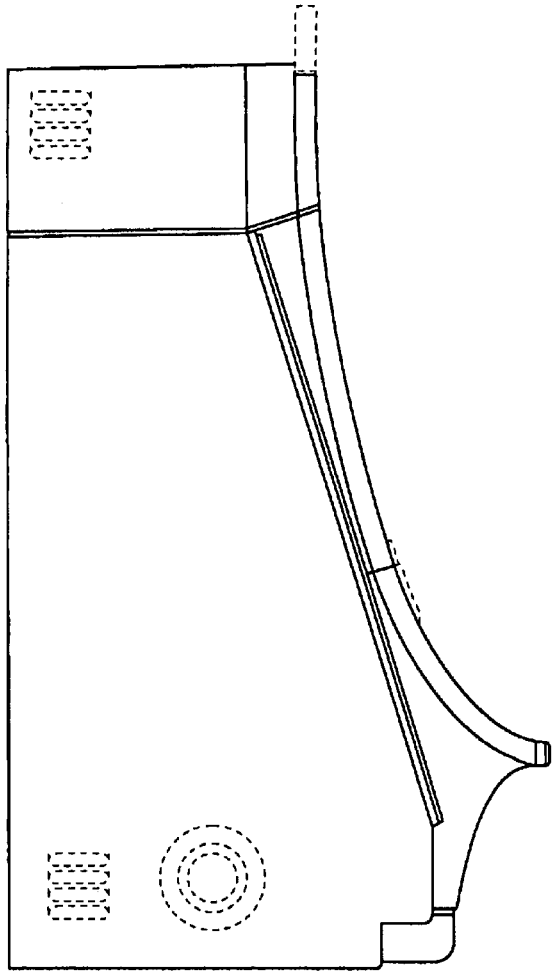
Figure 5:
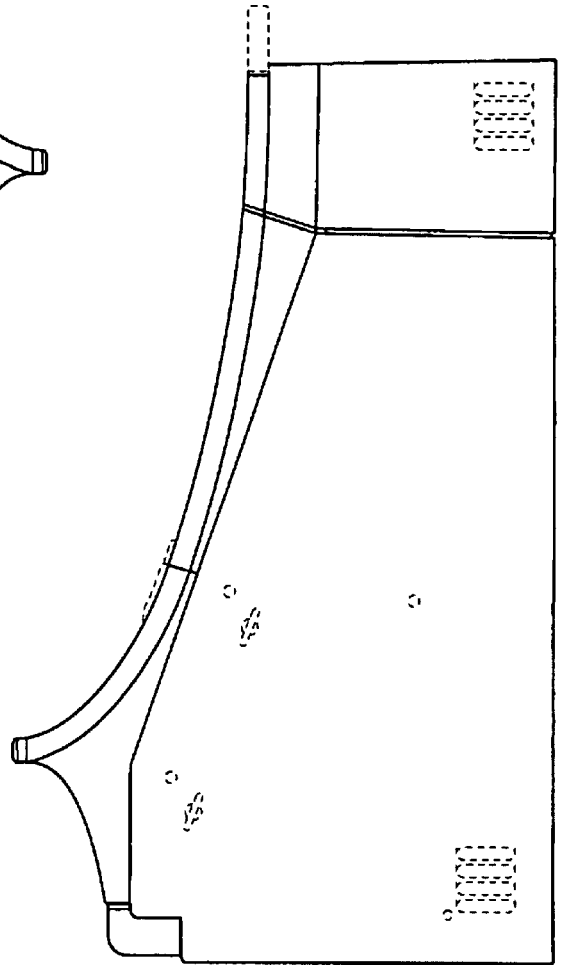
Figure 6:
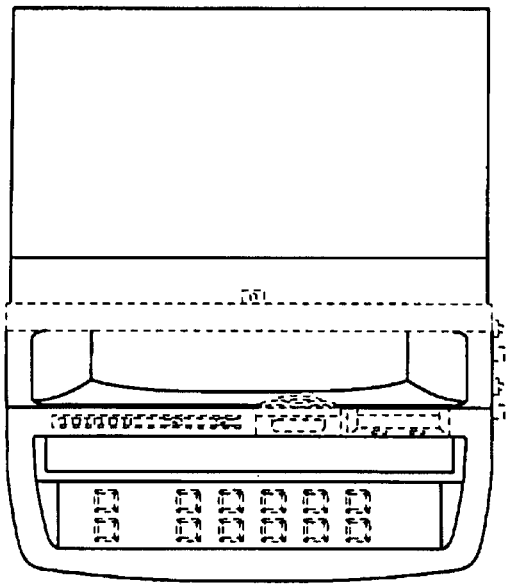
Figure 7:
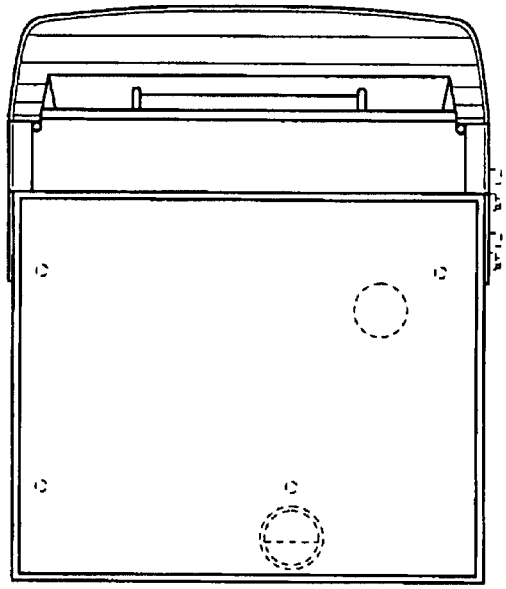
Figure 8:
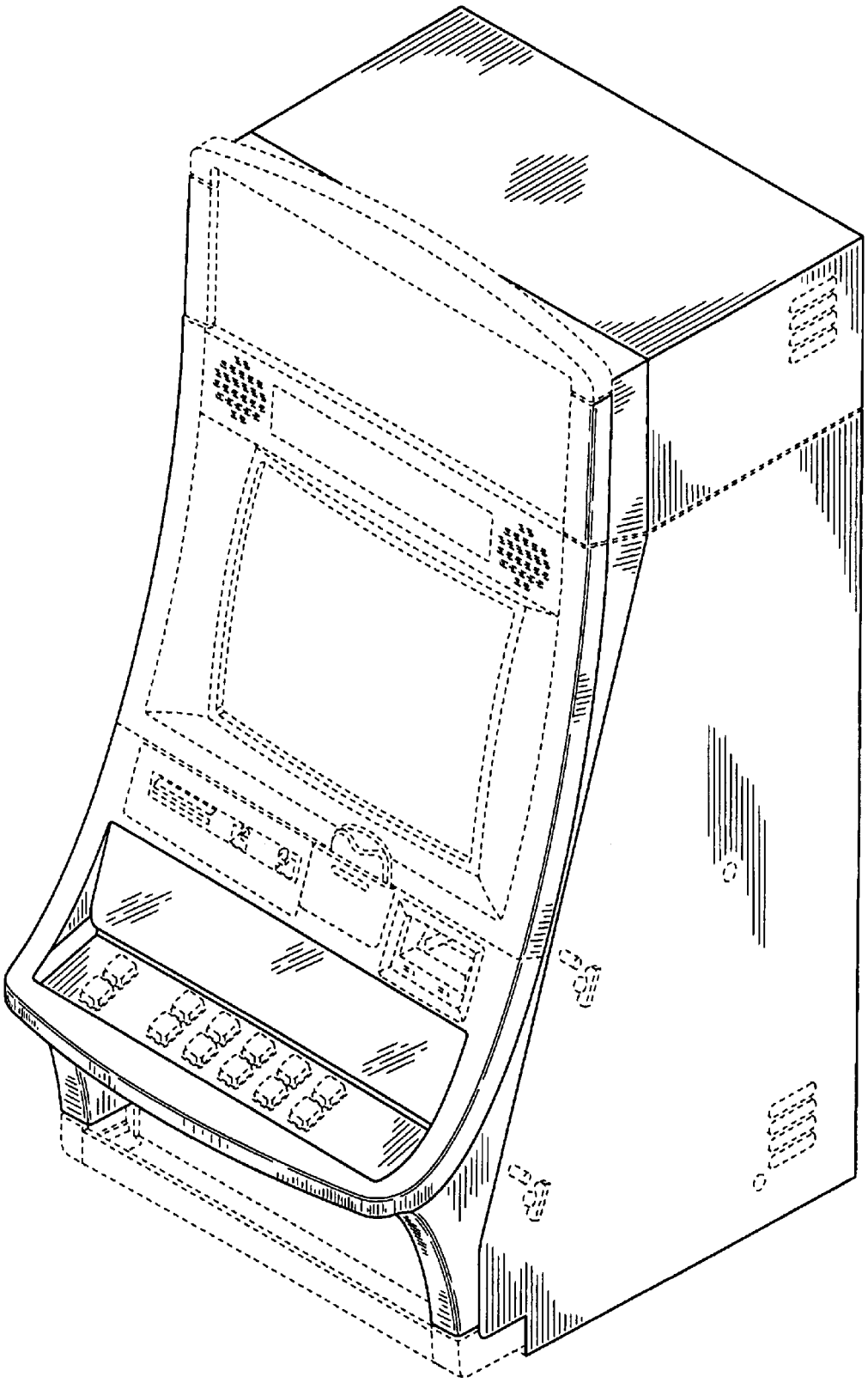
Figure 9:
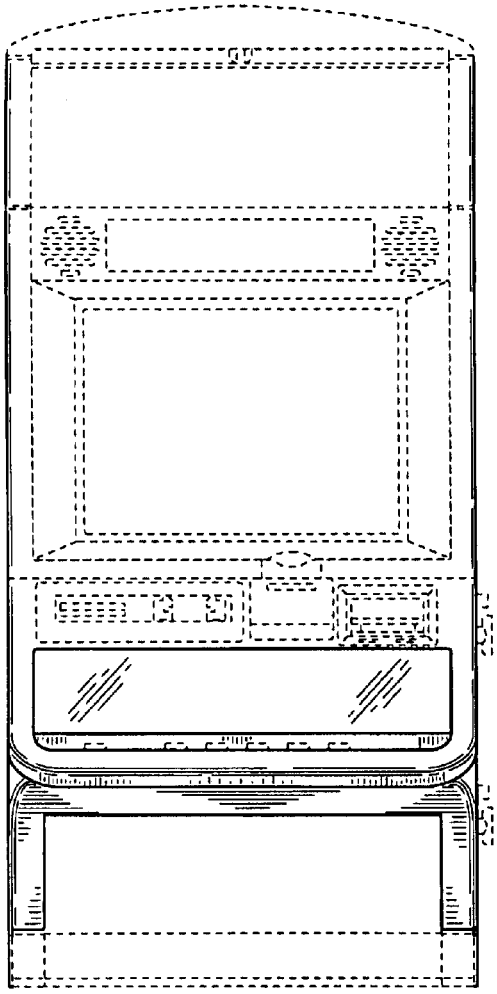
Figure 10:
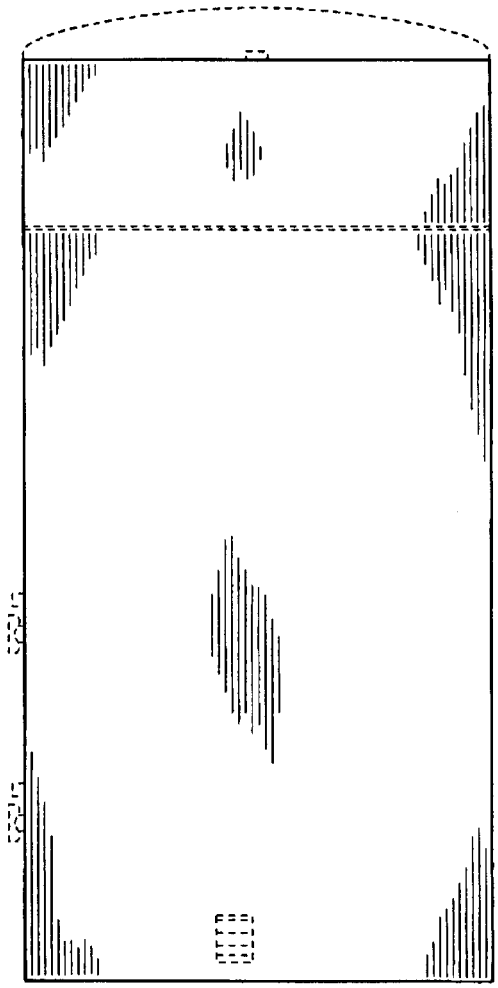
Figure 11:
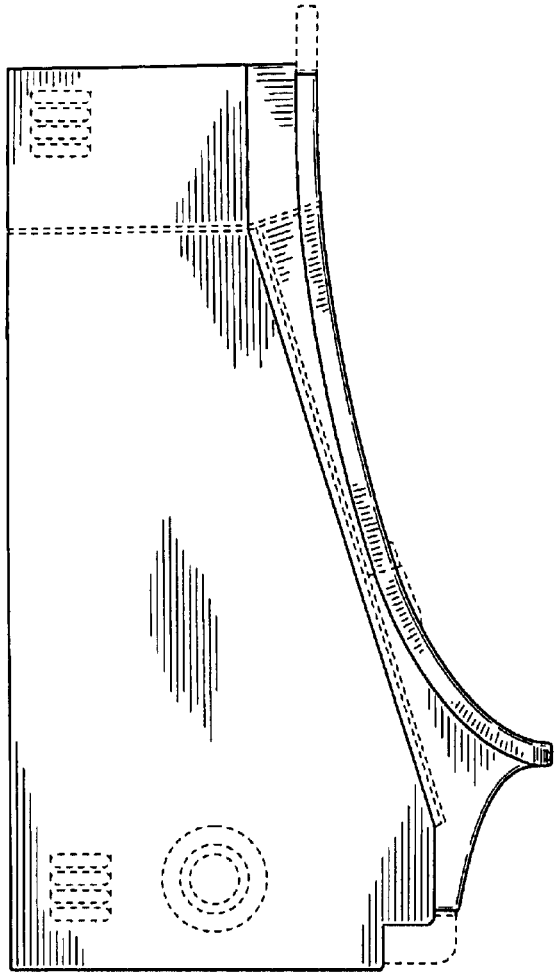
Figure 12:
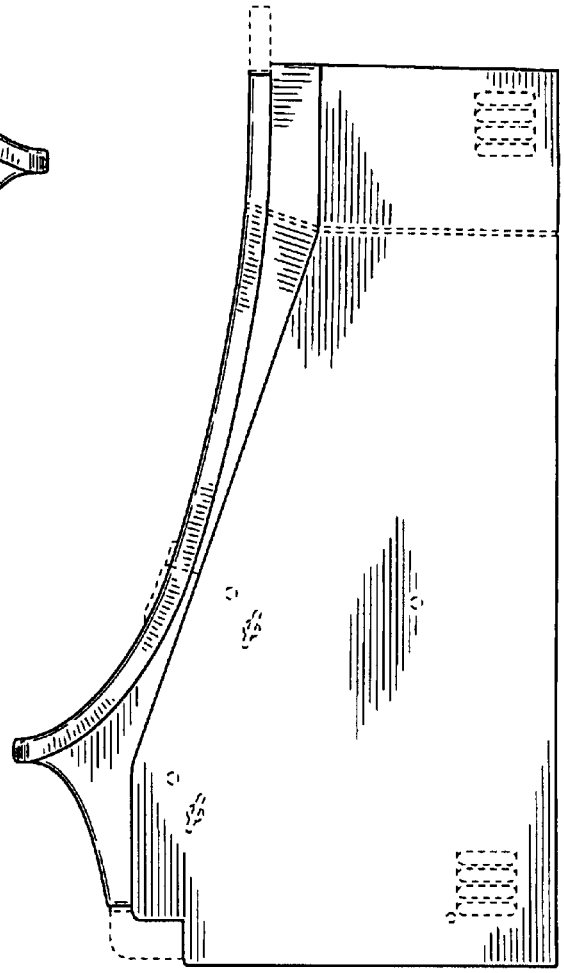
Figure 13:
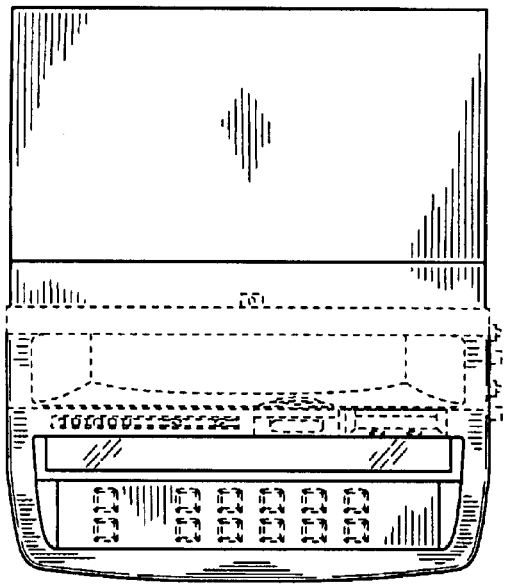
Figure 14:
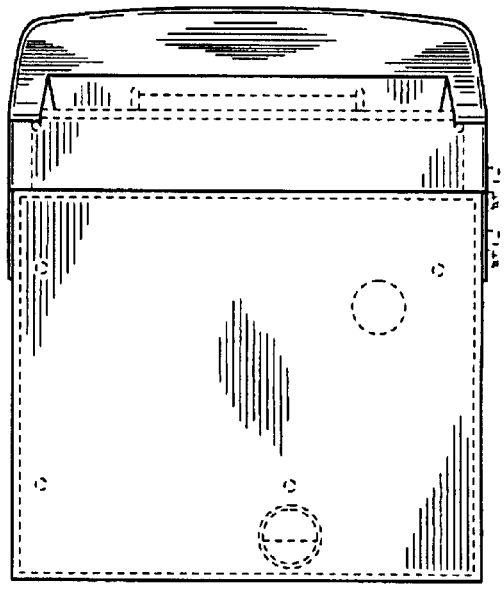

Matter enclosed in heavy brackets [ ] appears in the original patent, but forms no part of this reissue; matter printed in italics indicates the additions made by reissue.

U.S. PATENT DOCUMENTS

| | | | | |
|---|---|---|---|---|
| D428,062 | S | 7/2000 | Hayashi | D21/325 |
| D439,931 | S * | 4/2001 | Yamaguchi | D21/369 |
| 6,210,279 | B1 * | 4/2001 | Dickinson | 463/37 |
| D446,252 | S | 8/2001 | Yamaguchi | D21/325 |
| 6,290,229 | B1 | 9/2001 | Perez | 273/148 |
| 6,616,142 | B2 * | 9/2003 | Adams | 273/292 |
| D495,755 | S * | 9/2004 | Wurz et al. | D21/370 |

* cited by examiner